US012198593B2

(12) United States Patent
In

(10) Patent No.: US 12,198,593 B2
(45) Date of Patent: Jan. 14, 2025

(54) DRIVER AND DISPLAY DEVICE INCLUDING THE SAME

(71) Applicant: Samsung Display Co., LTD., Yongin-si (KR)

(72) Inventor: Hai-Jung In, Seoul (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 0 days.

(21) Appl. No.: 18/543,298

(22) Filed: Dec. 18, 2023

(65) Prior Publication Data

US 2024/0119881 A1 Apr. 11, 2024

Related U.S. Application Data

(63) Continuation of application No. 18/088,999, filed on Dec. 27, 2022, now Pat. No. 11,847,948.

(30) Foreign Application Priority Data

May 26, 2022 (KR) ........................ 10-2022-0064748

(51) Int. Cl.
*G09G 3/20* (2006.01)

(52) U.S. Cl.
CPC ....... *G09G 3/20* (2013.01); *G09G 2300/0426* (2013.01); *G09G 2300/08* (2013.01); *G09G 2310/06* (2013.01); *G09G 2310/08* (2013.01); *G09G 2320/02* (2013.01); *G09G 2320/043* (2013.01)

(58) Field of Classification Search
CPC ............. G09G 3/20; G09G 2300/0426; G09G 2300/08; G09G 2310/06; G09G 2310/08; G09G 2320/02; G09G 2320/043
See application file for complete search history.

(56) References Cited

U.S. PATENT DOCUMENTS

| | | | | |
|---|---|---|---|---|
| 10,453,386 B2 | 10/2019 | Jang | | |
| 2018/0032205 A1* | 2/2018 | Katsuta | ................. | G06F 3/0416 |
| 2018/0033354 A1* | 2/2018 | Lee | ......................... | G09G 3/006 |
| 2018/0033362 A1* | 2/2018 | Yamazaki | ............ | G09G 3/3648 |
| 2018/0033374 A1* | 2/2018 | Jeong | .................... | G09G 3/2088 |
| 2018/0033390 A1* | 2/2018 | Hosaka | ................ | G09G 3/3696 |
| 2018/0033404 A1* | 2/2018 | Lee | ......................... | G09G 5/395 |

(Continued)

*Primary Examiner* — Sejoon Ahn

(74) *Attorney, Agent, or Firm* — CANTOR COLBURN LLP

(57) ABSTRACT

A driver includes first to $M^{th}$ stages, where a first input signal and a second input signal are input to each of the first to $M^{th}$ stages, and each of the first to $M^{th}$ stages outputs a stage output signal, a first carry signal, and a second carry signal, where M is a natural number greater than or equal to 2. The first carry signal and the second carry signal output from a kth stage are the first input signal and the second input signal, which are input to a (k+1)th stage, respectively, where k is a natural number greater than or equal to 1 and less than M, and the first input signal and the second input signal, which are input to a first stage, are a first start signal and a second start signal which are alternately changed for predetermined frame times, respectively.

17 Claims, 9 Drawing Sheets

210:T29,T30,T33, C5,C6,C7 221:T25,T27 222:T26,T28 231:T1,T3,T17 232:T2,T4,T18 241:T19,T21,C3 242:T20,T22,C4 251:T5,T7,T9,T11,C1 252:T6,T8,T10,T12,C2 261:T13,T23 262:T14,T24 270:T15,T16 T31,T32

T1:T1-1,T1-2 T2:T2-1,T2-2 T3:T3-1,T3-2 T4:T4-1,T4-2 T5:T5-1,T5-2 T6:T6-1,T6-2 T17:T17-1,T17-2 T18:T18-1,T18-2 T34:T34-1,T34-2 T35:T35-1,T35-2

(56) References Cited

U.S. PATENT DOCUMENTS

2018/0052369 A1* 2/2018 Ko .................... G06F 3/04883
2018/0053459 A1* 2/2018 Fukai .................. G09G 3/3688
2018/0053465 A1* 2/2018 King ..................... G01P 15/18

* cited by examiner

DRIVER AND DISPLAY DEVICE INCLUDING THE SAME

This application is a continuation of U.S. patent application Ser. No. 18/088,999, filed on Dec. 27, 2022, which claims priority to Korean Patent Application No. 10-2022-0064748, filed on May 26, 2022, and all the benefits accruing therefrom under 35 U.S.C. § 119, the content of which in its entirety is herein incorporated by reference.

BACKGROUND

1. Field

Embodiments relate to a display device. More particularly, embodiments relate to a driver for outputting a stage output signal and a display device including the driver.

2. Description of the Related Art

A display device may include a gate driver, a data driver, an emission driver, or the like for driving a display panel. The emission driver may include transistors and capacitors for generating an emission control signal provided to the display panel.

When a positive bias or a negative bias is continuously applied to a transistor, characteristics of the transistor may be degraded. When the positive bias or the negative bias is continuously applied to an N-type oxide semiconductor transistor or an N-type amorphous silicon transistor, a threshold voltage of the transistor may shift positively or negatively, and accordingly, the characteristics of the transistor may be degraded.

SUMMARY

Embodiments provide a driver for preventing characteristics of a transistor thereof from being degraded.

Embodiments provide a display device including the driver.

A driver according to embodiments includes first to $M^{th}$ stages, where a first input signal and a second input signal are input to each of the first to $M^{th}$ stages, and each of the first to $M^{th}$ stages outputs a stage output signal, a first carry signal, and a second carry signal, where M is a natural number greater than or equal to 2. In such embodiments, the first carry signal and the second carry signal output from a $k^{th}$ stage are the first input signal and the second input signal, which are input to a $(k+1)^{th}$ stage, respectively, where k is a natural number greater than or equal to 1 and less than M. In such embodiments, the first input signal and the second input signal, which are input to a first stage, are a first start signal and a second start signal which are alternately changed for predetermined frame times, respectively.

In an embodiment, the first start signal of a first frame time may be substantially the same as the second start signal of a second frame time following the first frame time. In such an embodiment, the second start signal of the first frame time may be substantially the same as the first start signal of the second frame time.

In an embodiment, each of the first to $M^{th}$ stages may include a plurality of transistors. In such an embodiment, each of the transistors may be an N-type transistor.

In an embodiment, each of the first to $M^{th}$ stages may include a stage output circuit which provides a high voltage or a first low voltage as the stage output signal to a stage output terminal based on a voltage of a QF1 node, a voltage of a QF2 node, and a voltage of a QBF node, a first carry output circuit which provides the high voltage or a second low voltage as the first carry signal to a first carry output terminal based on a voltage of a Q1 node and a voltage of a QB1 node, and a second carry output circuit which provides the high voltage or the second low voltage as the second carry signal to a second carry output terminal based on a voltage of a Q2 node and a voltage of a QB2 node.

In an embodiment, the stage output circuit may include a twenty-ninth transistor including a first electrode which receives the high voltage, a second electrode connected to the stage output terminal, and a gate electrode connected to the QF1 node, a fifth capacitor including a first electrode connected to the QF1 node and a second electrode connected to the stage output terminal, a thirtieth transistor including a first electrode which receives the high voltage, a second electrode connected to the stage output terminal, and a gate electrode connected to the QF2 node, a sixth capacitor including a first electrode connected to the QF2 node and a second electrode connected to the stage output terminal, a thirty-third transistor including a first electrode which receives the first low voltage, a second electrode connected to the stage output terminal, and a gate electrode connected to the QBF node, and a seventh transistor including a first electrode connected to the QBF node and a second electrode which receives the first low voltage.

In an embodiment, the first carry output circuit may include a twenty-fifth transistor including a first electrode which receives the high voltage, a second electrode connected to the first carry output terminal, and a gate electrode connected to the QF1 node, and a twenty-seventh transistor including a first electrode which receives the second low voltage, a second electrode connected to the first carry output terminal, and a gate electrode connected to the QB1 node. In such an embodiment, the second carry output circuit include a twenty-sixth transistor including a first electrode which receives the high voltage, a second electrode connected to the second carry output terminal, and a gate electrode connected to the QF2 node, and a twenty-eighth transistor including a first electrode which receives the second low voltage, a second electrode connected to the second carry output terminal, and a gate electrode connected to the QB2 node.

In an embodiment, each of the first to $M^{th}$ stages may further include a first input circuit which controls the voltage of the Q1 node based on the first input signal, a first clock signal, a reset signal, the first low voltage, the voltage of the QB1 node, and the second low voltage, and a second input circuit which controls the voltage of the Q2 node based on the second input signal, the first clock signal, the reset signal, the first low voltage, the voltage of the QB2 node, and the second low voltage.

In an embodiment, the first input circuit may include a first transistor including a first electrode which receives the first input signal, a second electrode connected to the Q1 node, and a gate electrode which receives the first clock signal, a third transistor including a first electrode which receives the first low voltage, a second electrode connected to the Q1 node, and a gate electrode which receives the reset signal, and a seventeenth transistor including a first electrode which receives the second low voltage, a second electrode connected to the Q1 node, and a gate electrode connected to the QB1 node. In such an embodiment, the second input circuit may include a second transistor including a first electrode which receives the second input signal, a second electrode connected to the Q2 node, and a gate electrode which receives the first clock signal, a fourth transistor including a first electrode which receives the first low voltage, a second electrode connected to the Q2 node, and a gate electrode which receives the reset signal, and an eighteenth transistor including a first electrode which receives the second low voltage, a second electrode connected to the Q2 node, and a gate electrode connected to the QB2 node.

In an embodiment, each of the first to $M^{th}$ stages may further include a QF1 node control circuit which controls the voltage of the QF1 node based on the voltage of the Q1 node and the second clock signal, and a QF2 node control circuit which controls the voltage of the QF2 node based on the voltage of the Q2 node and the second clock signal.

In an embodiment, the QF1 node control circuit may include a nineteenth transistor including a first electrode connected to the Q1 node, a second electrode connected to the QF1 node, and a gate electrode which receives the high voltage, a twenty-first transistor including a first electrode which receives the second clock signal, a second electrode, and a gate electrode connected to the QF1 node, and a third capacitor including a first electrode connected to the second electrode of the twenty-first transistor and a second electrode connected to the QF1 node. In such an embodiment, the QF2 node control circuit may include a twentieth transistor including a first electrode connected to the Q2 node, a second electrode connected to the QF2 node, and a gate electrode which receives the high voltage, a twenty-second transistor including a first electrode which receives the second clock signal, a second electrode, and a gate electrode connected to the QF2 node, and a fourth capacitor including a first electrode connected to the second electrode of the twenty-second transistor and a second electrode connected to the QF2 node.

In an embodiment, each of the first to $M^{th}$ stages may further include a first signal processor which controls a voltage of a first node based on the voltage of the Q1 node, the first clock signal, the high voltage, and the second clock signal, and a second signal processor which controls a voltage of a second node based on the voltage of the Q2 node, the first clock signal, the high voltage, and the second clock signal.

In an embodiment, the first signal processor may include a fifth transistor including a first electrode which receives the first clock signal, a second electrode, and a gate electrode connected to the Q1 node, a seventh transistor including a first electrode connected to the second electrode of the fifth transistor, a second electrode which receives the high voltage, and a gate electrode which receives the first clock signal, a ninth transistor including a first electrode connected to the second electrode of the fifth transistor, a second electrode, and a gate electrode which receives the high voltage, an eleventh transistor including a first electrode which receives the second clock signal, a second electrode connected to the first node, and a gate electrode connected to the second electrode of the ninth transistor, and a first capacitor including a first electrode connected to the second electrode of the ninth transistor and a second electrode connected to the first node. In such an embodiment, the second signal processor may include a sixth transistor including a first electrode which receives the first clock signal, a second electrode, and a gate electrode connected to the Q2 node, an eighth transistor including a first electrode connected to the second electrode of the sixth transistor, a second electrode which receives the high voltage, and a gate electrode which receives the first clock signal, a tenth transistor including a first electrode connected to the second electrode of the sixth transistor, a second electrode, and a gate electrode which receives the high voltage, a twelfth transistor including a first electrode which receives the second clock signal, a second electrode connected to the second node, and a gate electrode connected to the second electrode of the tenth transistor, and a second capacitor including a first electrode connected to the second electrode of the tenth transistor and a second electrode connected to the second node.

In an embodiment, each of the first to $M^{th}$ stages may further include a QB1 node control circuit which controls the voltage of the QB1 node based on the voltage of the first node and the voltage of the Q1 node, and a QB2 node control circuit which controls the voltage of the QB2 node based on the voltage of the second node and the voltage of the Q2 node.

In an embodiment, the QB1 node control circuit may include a thirteenth transistor including a first electrode which receives the high voltage, a second electrode connected to the QB1 node, and a gate electrode connected to the first node, and a twenty-third transistor including a first electrode which receives the second low voltage, a second electrode connected to the QB1 node, and a gate electrode connected to the Q1 node. In such an embodiment, the QB2 node control circuit may include a fourteenth transistor including a first electrode which receives the high voltage, a second electrode connected to the QB2 node, and a gate electrode connected to the second node, and a twenty-fourth transistor including a first electrode which receives the second low voltage, a second electrode connected to the QB2 node, and a gate electrode connected to the Q2 node.

In an embodiment, each of the first to $M^{th}$ stages may further include a QBF node control circuit which controls the voltage of the QBF node based on the voltage of the first node, the voltage of the second node, the voltage of the Q1 node, and the voltage of the Q2 node.

In an embodiment, the QBF node control circuit may include a fifteenth transistor including a first electrode which receives the high voltage, a second electrode, and a gate electrode connected to the first node, a sixteenth transistor including a first electrode connected to the second electrode of the fifteenth transistor, a second electrode connected to the QBF node, and a gate electrode connected to the second node, a thirty-first transistor including a first electrode which receives the second low voltage, a second electrode connected to the QBF node, and a gate electrode connected to the Q1 node, and a thirty-second transistor including a first electrode which receives the second low voltage, a second electrode connected to the QBF node, and a gate electrode connected to the Q2 node.

In an embodiment, the driver may further include a start multiplexer to which a start signal and a second low voltage are input, and which outputs the first start signal and the second start signal to the first stage.

In an embodiment, the start multiplexer may include a first start transistor including a first electrode which receives the start signal, a second electrode which outputs the first start signal, and a gate electrode which receives a first selection signal, a second start transistor including a first electrode which receives the start signal, a second electrode which outputs the second start signal, and a gate electrode which receives a second selection signal, a first low transistor including a first electrode which receives the second low voltage, a second electrode which outputs the first start signal, and a gate electrode which receives a third selection signal, and a second low transistor including a first electrode which receives the second low voltage, a second electrode which outputs the second start signal, and a gate electrode which receives a fourth selection signal.

In an embodiment, the driver may further include a start multiplexer to which a start signal, a second low voltage, and a high voltage are input, and which outputs the first start signal and the second start signal to the first stage.

In an embodiment, the start multiplexer may include a first high transistor including a first electrode which receives a first selection signal, a second electrode, and a gate electrode which receives the high voltage, a second high transistor including a first electrode which receives a second selection signal, a second electrode, and a gate electrode which receives the high voltage, a first start transistor including a first electrode which receives the start signal, a second electrode which outputs the first start signal, and a gate electrode connected to the second electrode of the first high transistor, a second start transistor including a first electrode which receives the start signal, a second electrode which outputs the second start signal, and a gate electrode connected to the second electrode of the second high transistor, a first boost capacitor including a first electrode connected to the second electrode of the first high transistor and a second electrode connected to the second electrode of the first start transistor, a second boost capacitor including a first electrode connected to the second electrode of the second high transistor and a second electrode connected to the second electrode of the second start transistor, a first low transistor including a first electrode which receives the second low voltage, a second electrode which outputs the first start signal, and a gate electrode which receives a third selection signal, and a second low transistor including a first electrode which receives the second low voltage, a second electrode which outputs the second start signal, and a gate electrode which receives a fourth selection signal.

A display device according to embodiments includes a display panel including a plurality of pixels, a gate driver which provides a gate signal to each of the pixels, a data driver which provides a data signal to each of the pixels, and a driver which provides a stage output signal to each of the pixels, where the driver includes first to $M^{th}$ stages, a first input signal and a second input signal are input to each of the first to $M^{th}$ stages and each of the first to $M^{th}$ stages outputs the stage output signal, a first carry signal, and a second carry signal, where M is a natural number greater than or equal to 2. In such embodiments, the first carry signal and the second carry signal output from a $k^{th}$ stage are the first input signal and the second input signal, which are input to a $(k+1)^{th}$ stage, respectively, where k is a natural number greater than or equal to 1 and less than M. In such embodiments, the first input signal and the second input signal, which are input to a first stage, are a first start signal and a second start signal which are alternately changed for predetermined frame times, respectively.

In the driver and the display device including the driver according to the embodiments, the first start signal and the second start signal alternately changed for the predetermined frame times may be input to the first stage as the first input signal and the second signal, and the first carry signal and the second carry signal output from the previous stage may be input to the next stage as the first input signal and the second input signal, so that a positive bias and a negative bias may be alternately applied to a transistor included in the driver. Accordingly, the characteristics of the transistor included in the driver may be effectively prevented from being degraded.

BRIEF DESCRIPTION OF THE DRAWINGS

Illustrative, non-limiting embodiments will be more clearly understood from the following detailed description taken in conjunction with the accompanying drawings.

DETAILED DESCRIPTION

Figure 1:
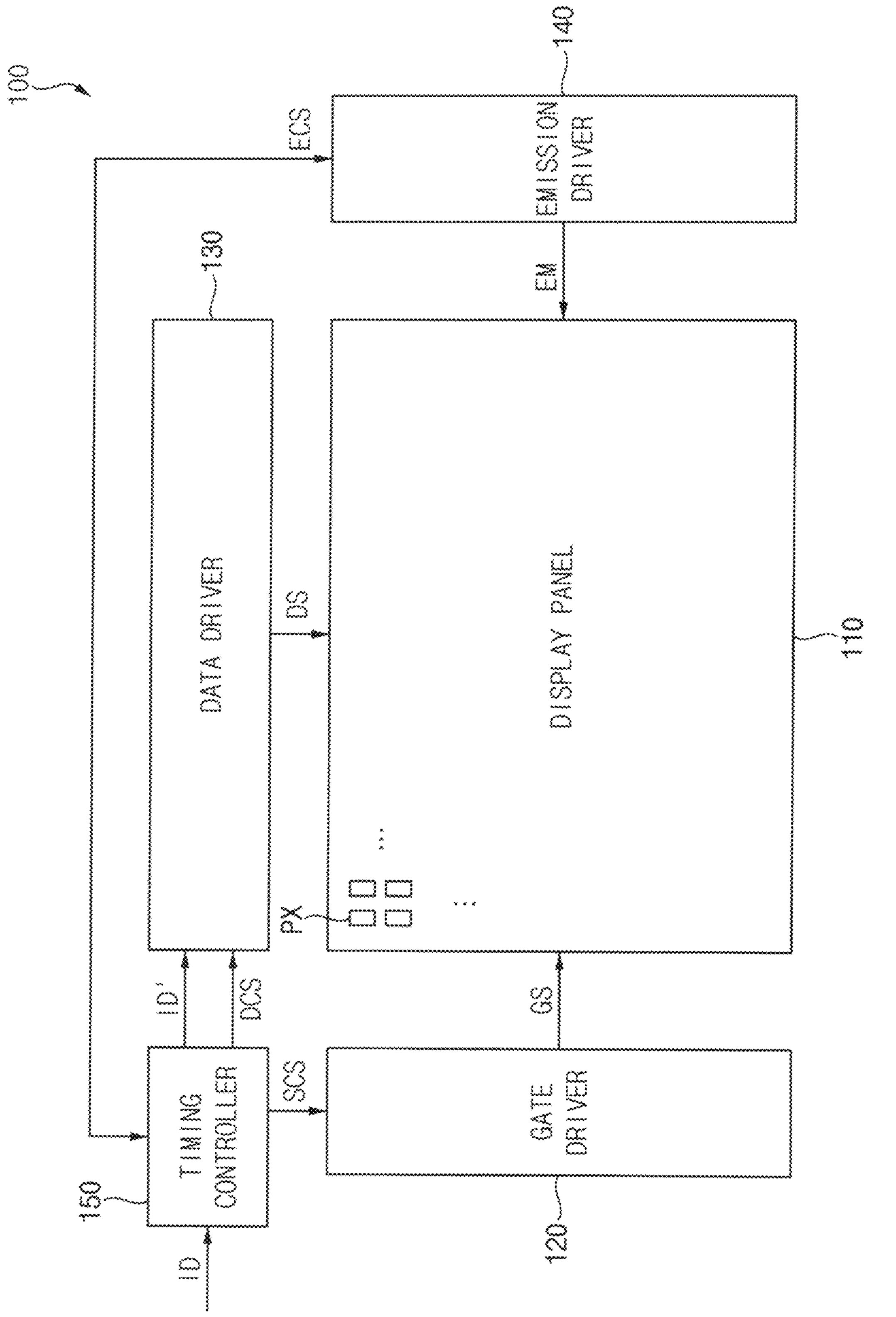
FIG. 1 is a block diagram illustrating a display device according to an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/ or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described in detail with reference to the accompanying drawings.

FIG. 1 is a block diagram illustrating a display device 100 according to an embodiment.

Referring to FIG. 1, an embodiment of the display device 100 may include a display panel 110, a gate driver 120, a data driver 130, an emission driver 140, and a timing controller 150.

The display panel 110 may display an image. The display panel 110 may include a plurality of pixels PX. The pixels PX may be arranged in a substantially matrix form, and accordingly, the pixels PX may define pixel rows and pixel columns. Each of the pixels PX may emit light, and the display panel 110 may display an image in which the light is combined. In an embodiment, each of the pixels PX may emit red, green, blue, or white light.

The gate driver 120 may generate a gate signal GS based on a first driving control signal SCS. The gate driver 120 may provide the gate signal GS to each of the pixels PX. The gate driver 120 may sequentially provide the gate signal GS to each of the pixel rows. In an embodiment, the gate driver 120 may be provided or formed on the display panel 110 in the form of a circuit.

The data driver 130 may generate a data signal DS based on a second driving control signal DCS and output image data ID'. The data driver 130 may provide the data signal DS to each of the pixels PX. The data driver 130 may provide the data signal DS to the pixel row selected by the gate signal GS. In an embodiment, the data driver 130 may be mounted on the display panel 110 or a circuit board electrically connected to the display panel 110 in the form of a driving chip.

The emission driver 140 may generate an emission control signal EM based on a third driving control signal ECS. The emission driver 140 may provide the emission control signal EM to each of the pixels PX. The emission driver 140 may sequentially provide the emission control signal EM to each of the pixel rows. In an embodiment, the emission driver 140 may be provided or formed on the display panel 110 in the form of a circuit.

The timing controller 150 may control driving of the gate driver 120, driving of the data driver 130, and driving of the emission driver 140. The timing controller 150 may generate the first driving control signal SCS, the second driving control signal DCS, the third driving control signal ECS, and the output image data ID' based on a control signal and input image data ID. The timing controller 150 may provide the first driving control signal SCS to the gate driver 120, may provide the second driving control signal DCS and the output image data ID' to the data driver 130, and may provide the third driving control signal ECS to the emission driver 140. In an embodiment, the timing controller 150 may be mounted on a circuit board electrically connected to the display panel 110 in the form of a driving chip.

Figure 2:
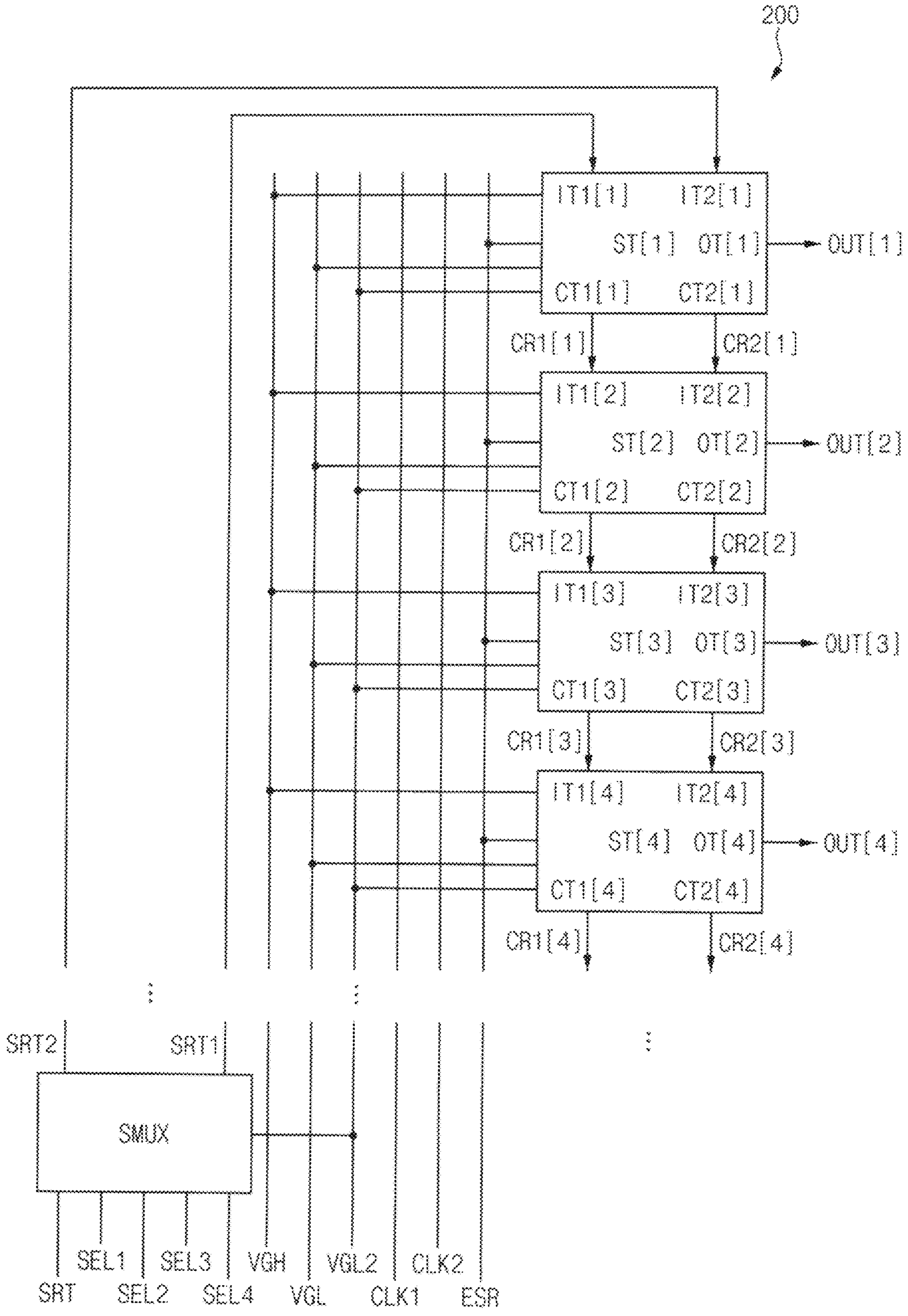
FIG. 2 is a block diagram illustrating a driver according to an embodiment.

FIG. 2 is a block diagram illustrating a driver 200 according to an embodiment.

Referring to FIGS. 1 and 2, the driver 200 may include first to $M^{th}$ stages ST[1], ST[2], . . . and a start multiplexer SMUX, where M is a natural number greater than or equal to 2. In an embodiment, the driver 200 may be the emission driver 140. However, the present disclosure is not limited thereto, and in an alternative embodiment, the driver 200 may be the gate driver 120.

A first input signal and a second input signal may be input to each of the first to $M^{th}$ stages ST[1], ST[2], . . . , and each of the first to $M^{th}$ stages ST[1], ST[2], . . . may output a stage output signal OUT, a first carry signal CR1, and a second carry signal CR2. Further, a high voltage VGH, a first low voltage VGL, a second low voltage VGL2, a first clock signal CLK1, a second clock signal CLK2, and a reset signal ESR may be input to each of the first to $M^{th}$ stages ST[1], ST[2], . . . .

A voltage level of the high voltage VGH may be a logic high level, and each of a voltage level of the first low voltage VGL and a voltage level of the second low voltage VGL2 may be a logic low level. In an embodiment, the voltage level of the second low voltage VGL2 may be lower than the voltage level of the first low voltage VGL.

The stage output signal OUT[k] output from a $k^{th}$ stage ST[k] may be provided to a $k^{th}$ pixel row of the display panel 110, where k is a natural number greater than or equal to 1 and less than M. In an embodiment, for example, the stage output signal OUT[1] output from a first stage ST[1] may be provided to a first pixel row of the display panel 110, and the stage output signal OUT[2] output from a second stage ST[2] may be provided to a second pixel row of the display panel 110.

The first carry signal CR1[*k*] and the second carry signal CR2[*k*] output from the $k^{th}$ stage ST[k] may be the first input signal and the second input signal input to the $(k+1)^{th}$ stage ST[k+1], respectively. In an embodiment, for example, the first carry signal CR1[1] and the second carry signal CR2[1] output from the first stage ST[1] may be the first input signal and the second input signal input to the second stage ST[2], respectively, and the first carry signal CR1[2] and the second carry signal CR2[2] output from the second stage ST[2] may be the first input signal and the second input signal input to a third stage ST[3], respectively.

The $k^{th}$ stage ST[k] may include a first input terminal IT1[k], a second input terminal IT2[*k*], a stage output terminal OT[k], a first carry output terminal CT1[*k*], and a second carry output terminal CT2[*k*]. The first input signal may be input to the first input terminal IT1[*k*], and the second input signal may be input to the second input terminal IT2[*k*]. The stage output terminal OT[k] may output the stage output signal OUT[k], the first carry output terminal CT1[*k*] may output the first carry signal CR1[*k*], and the second carry output terminal CT2[*k*] may output the second carry signal CR2[*k*].

A start signal SRT and the second low voltage VGL2 may be input to the start multiplexer SMUX, and the start multiplexer SMUX may output a first start signal SRT1 and a second start signal SRT2 to the first stage ST[1].

The first start signal SRT1 and the second start signal SRT2 output from the start multiplexer SMUX may be the first input signal and the second input signal input to the first stage ST[1], respectively. The first start signal SRT1 and the second start signal SRT2 may be alternately changed for predetermined frame times. Accordingly, the first input signal and the second input signal input to the first stage ST[1] may be alternately changed for the predetermined frame times. The first start signal SRT1 and the second start signal SRT2 will be described in detail below with reference to FIG. 5.

Figure 3:
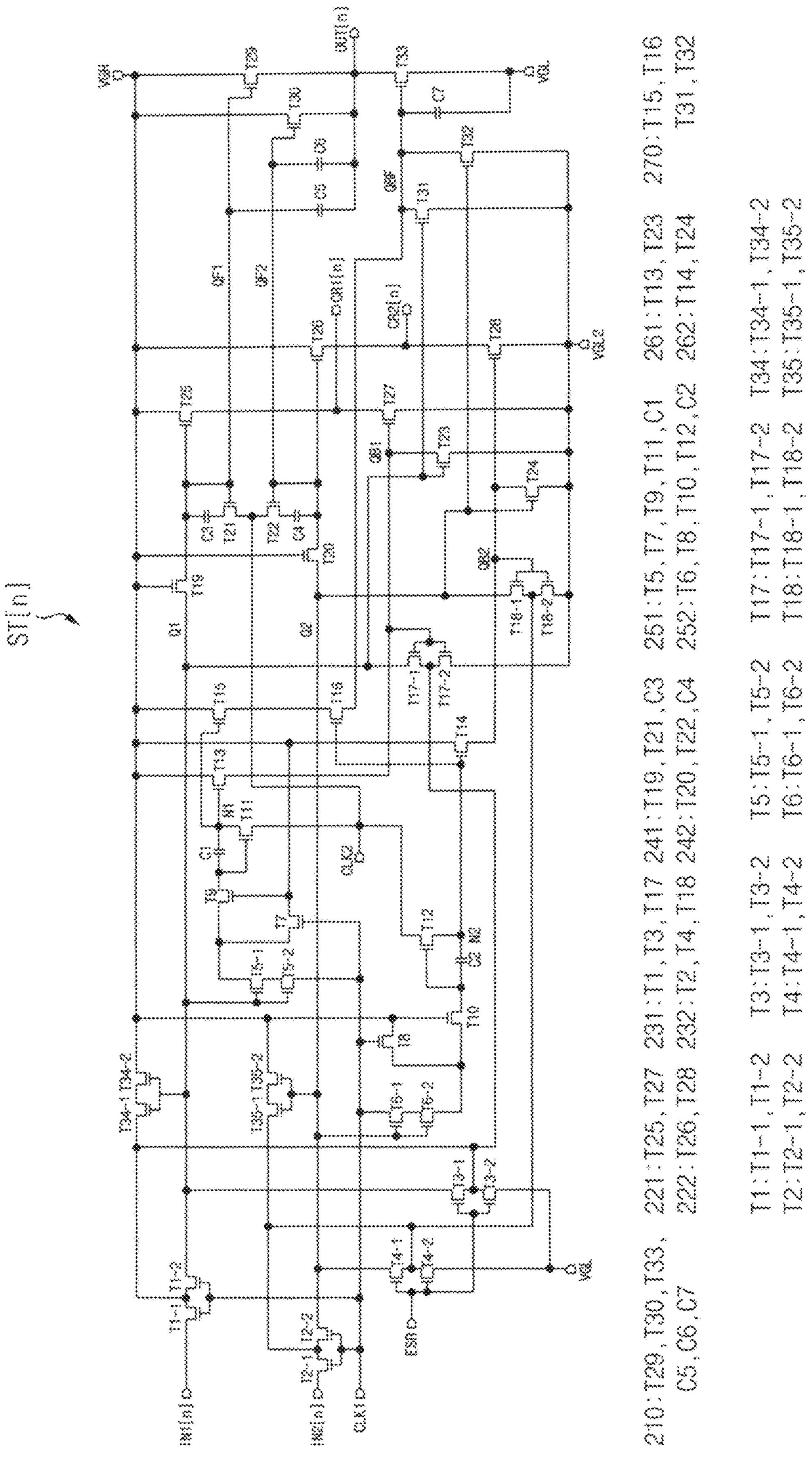
FIG. 3 is a circuit diagram illustrating an embodiment of a stage included in the driver in FIG. 2.

FIG. 3 is a circuit diagram illustrating an embodiment of a stage ST[n] included in the driver 200 in FIG. 2. Particularly, FIG. 3 may illustrate one stage ST[n] among the first to $M^{th}$ stages ST[1], ST[2], . . . in FIG. 2.

Referring to FIGS. 2 and 3, an embodiment of the stage ST[n] may include a stage output circuit 210, a first carry output circuit 221, a second carry output circuit 222, a first input circuit 231, a second input circuit 232, a QF1 node control circuit 241, a QF2 node control circuit 242, a first signal processor 251, a second signal processor 252, a QB1 node control circuit 261, a QB2 node control circuit 262, and a QBF node control circuit 270.

The stage output circuit 210 may provide the high voltage VGH or the first low voltage VGL as the stage output signal OUT[n] to the stage output terminal OT[n] based on a voltage of the QF1 node, a voltage of the QF2 node, and a voltage of the QBF node. The stage output circuit 210 may include a twenty-ninth transistor T29, a fifth capacitor C5, a thirtieth transistor T30, a sixth capacitor C6, a thirty-third transistor T33, and a seventh capacitor C7.

The twenty-ninth transistor T29 may include a first electrode that receives the high voltage VGH, a second electrode connected to the stage output terminal OT[n], and a gate electrode connected to the QF1 node. The twenty-ninth transistor T29 may be turned on or off in response to the voltage of the QF1 node. When the twenty-ninth transistor T29 is turned on, the stage output signal OUT[n] may have a logic high level (e.g., a gate-on voltage of an N-type transistor).

The fifth capacitor C5 may include a first electrode connected to the QF1 node and a second electrode connected to the stage output terminal OT[n]. The fifth capacitor C5 may speed turn-on and turn-off of the twenty-ninth transistor T29, that is, allow the twenty-ninth transistor T29 to be turned on and turned off more rapidly. The fifth capacitor C5 may function as a boosting capacitor that quickly or rapidly pulls up the stage output signal OUT[n].

The thirtieth transistor T30 may include a first electrode that receives the high voltage VGH, a second electrode connected to the stage output terminal OT[n], and a gate electrode connected to the QF2 node. The thirtieth transistor T30 may be turned on or off in response to the voltage of the QF2 node. When the thirtieth transistor T30 is turned on, the stage output signal OUT[n] may have the logic high level (e.g., the gate-on voltage of the N-type transistor).

The sixth capacitor C6 may include a first electrode connected to the QF2 node and a second electrode connected to the stage output terminal OT[n]. The sixth capacitor C6 may speed turn-on and turn-off of the thirtieth transistor T30. The sixth capacitor C6 may function as a boosting capacitor that quickly pulls up the stage output signal OUT[n].

The thirty-third transistor T33 may include a first electrode that receives the first low voltage VGL, a second electrode connected to the stage output terminal OT[n], and a gate electrode connected to the QBF node. The thirty-third transistor T33 may be turned on or off in response to the voltage of the QBF node. When the thirty-third transistor T33 is turned on, the stage output signal OUT[n] may have a logic low level (e.g., a gate-off voltage of the N-type transistor).

The seventh capacitor C7 may include a first electrode connected to the QBF node and a second electrode that receives the first low voltage VGL. The seventh capacitor C7 may speed turn-on and turn-off of the thirty-third transistor T33. The seventh capacitor C7 may function as a boosting capacitor that quickly pulls down the stage output signal OUT [n].

The first carry output circuit 221 may provide the high voltage VGH or the second low voltage VGL2 as the first carry signal CR1[*n*] to the first carry output terminal CT1[*n*] based on the voltage of the QF1 node and the voltage of the QB1 node. The first carry output circuit 221 may include a twenty-fifth transistor T25 and a twenty-seventh transistor T27.

The twenty-fifth transistor T25 may include a first electrode that receives the high voltage VGH, a second electrode connected to the first carry output terminal CT1[*n*], and a gate electrode connected to the QF1 node. The twenty-fifth transistor T25 may be turned on or off in response to the voltage of the QF1 node. When the twenty-fifth transistor T25 is turned on, the first carry signal CR1[*n*] may have the logic high level (e.g., the gate-on voltage of the N-type transistor).

The twenty-seventh transistor T27 may include a first electrode that receives the second low voltage VGL2, a second electrode connected to the first carry output terminal CT1[*n*], and a gate electrode connected to the QB1 node. The twenty-seventh transistor T27 may be turned on or off in response to the voltage of the QB1 node. When the twenty-seventh transistor T27 is turned on, the first carry signal CR1[*n*] may have the logic low level (e.g., the gate-off voltage of the N-type transistor).

The second carry output circuit 222 may provide the high voltage VGH or the second low voltage VGL2 as the second carry signal CR2[*n*] to the second carry output terminal CT2[*n*] based on the voltage of the QF2 node and the voltage of the QB2 node. The second carry output circuit 222 may include a twenty-sixth transistor T26 and a twenty-eighth transistor T28.

The twenty-sixth transistor T26 may include a first electrode that receives the high voltage VGH, a second electrode connected to the second carry output terminal CT2[*n*], and a gate electrode connected to the QF2 node. The twenty-sixth transistor T26 may be turned on or off in response to the voltage of the QF2 node. When the twenty-sixth transistor T26 is turned on, the second carry signal CR2[*n*] may have the logic high level (e.g., the gate-on voltage of the N-type transistor).

The twenty-eighth transistor T28 may include a first electrode that receives the second low voltage VGL2, a second electrode connected to the second carry output terminal CT2[*n*], and a gate electrode connected to the QB2 node. The twenty-eighth transistor T28 may be turned on or off in response to the voltage of the QB2 node. When the twenty-eighth transistor T28 is turned on, the second carry signal CR2[*n*] may have the logic low level (e.g., the gate-off voltage of the N-type transistor).

The first input circuit 231 may control the voltage of the Q1 node based on the first input signal IN1[*n*], the first clock signal CLK1, the reset signal ESR, the first low voltage VGL, the voltage of the QB1 node, and the second low voltage VGL2. The first input circuit 231 may include a first transistor T1, a third transistor T3, and a seventeenth transistor T17.

The first transistor T1 may include a first electrode that receives the first input signal IN1[*n*], a second electrode connected to the Q1 node, and a gate electrode that receives the first clock signal CLK1. The first transistor T1 may be turned on when the first clock signal CLK1 has a gate-on level to transmit the first input signal IN1[*n*] to the Q1 node.

In an embodiment, the first transistor T1 may include a plurality of sub-transistors T1-1 and T1-2 connected to each other in series. Each of the sub-transistors T1-1 and T1-2 may include a gate electrode that commonly receives the first clock signal CLK1. Accordingly, current leakage by the first transistor T1 may be minimized.

The third transistor T3 may include a first electrode that receives the first low voltage VGL, a second electrode connected to the Q1 node, and a gate electrode that receives the reset signal ESR. The third transistor T3 may be turned on when the reset signal ESR has a gate-on level to transmit the first low voltage VGL to the Q1 node.

The reset signal ESR may have the gate-on level when the display device 100 is turned on. A problem in which the display device 100 unintentionally emits light when the display device 100 is turned on may be prevented by the reset signal ESR.

In an embodiment, the third transistor T3 may include a plurality of sub-transistors T3-1 and T3-2 connected to each other in series. Each of the sub-transistors T3-1 and T3-2 may include a gate electrode that commonly receives the reset signal ESR. Accordingly, current leakage by the third transistor T3 may be minimized.

The seventeenth transistor T17 may include a first electrode that receives the second low voltage VGL2, a second electrode connected to the Q1 node, and a gate electrode connected to the QB1 node. The seventeenth transistor T17 may be turned on when the voltage of the QB1 node has a gate-on level to transmit the second low voltage VGL2 to the Q1 node.

In an embodiment, the seventeenth transistor T17 may include a plurality of sub-transistors T17-1 and T17-2 connected to each other in series. Each of the sub-transistors T17-1 and T17-2 may include a gate electrode commonly connected to the QB1 node. Accordingly, current leakage by the seventeenth transistor T17 may be minimized.

The second input circuit 232 may control the voltage of the Q2 node based on the second input signal IN2[*n*], the first clock signal CLK1, the reset signal ESR, the first low voltage VGL, the voltage of the QB2 node, and the second low voltage VGL2. The second input circuit 232 may include a second transistor T2, a fourth transistor T4, and an eighteenth transistor T18.

The second transistor T2 may include a first electrode that receives the second input signal IN2[*n*], a second electrode connected to the Q2 node, and a gate electrode that receives the first clock signal CLK1. The second transistor T2 may be turned on when the first clock signal CLK1 has a gate-on level to transmit the second input signal IN2[*n*] to the Q2 node.

In an embodiment, the second transistor T2 may include a plurality of sub-transistors T2-1 and T2-2 connected to each other in series. Each of the sub-transistors T2-1 and T2-2 may include a gate electrode that commonly receives the first clock signal CLK1. Accordingly, current leakage by the second transistor T2 may be minimized.

The fourth transistor T4 may include a first electrode that receives the first low voltage VGL, a second electrode connected to the Q2 node, and a gate electrode that receives the reset signal ESR. The fourth transistor T4 may be turned on when the reset signal ESR has a gate-on level to transmit the first low voltage VGL to the Q2 node.

In an embodiment, the fourth transistor T4 may include a plurality of sub-transistors T4-1 and T4-2 connected to each other in series. Each of the sub-transistors T4-1 and T4-2 may include a gate electrode that commonly receives the reset signal ESR. Accordingly, current leakage by the fourth transistor T4 may be minimized.

The eighteenth transistor T18 may include a first electrode that receives the second low voltage VGL2, a second electrode connected to the Q2 node, and a gate electrode connected to the QB2 node. The eighteenth transistor T18 may be turned on when the voltage of the QB2 node has a gate-on level to transmit the second low voltage VGL2 to the Q2 node.

In an embodiment, the eighteenth transistor T18 may include a plurality of sub-transistors T18-1 and T18-2 connected to each other in series. Each of the sub-transistors T18-1 and T18-2 may include a gate electrode commonly connected to the QB2 node. Accordingly, current leakage by the eighteenth transistor T18 may be minimized.

The QF1 node control circuit 241 may control the voltage of the QF1 node based on the voltage of the Q1 node and the second clock signal CLK2. The QF1 node control circuit 241 may include a nineteenth transistor T19, a twenty-first transistor T21, and a third capacitor C3.

The nineteenth transistor T19 may include a first electrode connected to the Q1 node, a second electrode connected to the QF1 node, and a gate electrode that receives the high voltage VGH. The nineteenth transistor T19 may always be maintained in a turned-on state.

The twenty-first transistor T21 may include a first electrode that receives the second clock signal CLK2, a second electrode, and a gate electrode connected to the QF1 node.

The third capacitor C3 may include a first electrode connected to the second electrode of the twenty-first transistor T21 and a second electrode connected to the QF1 node. The third capacitor C3 may function as a boosting capacitor boosting the voltage of the QF1 node. In an embodiment, for example, when the second clock signal CLK2 has the high voltage VGH and the voltage of the Q1 node is the high voltage VGH, the sum of the high voltage VGH of the Q1 node and the boosting voltage may be applied to the QF1 node by the boosting of the third capacitor C3.

The QF2 node control circuit 242 may control the voltage of the QF2 node based on the voltage of the Q2 node and the second clock signal CLK2. The QF2 node control circuit 242 may include a twentieth transistor T20, a twenty-second transistor T22, and a fourth capacitor C4.

The twentieth transistor T20 may include a first electrode connected to the Q2 node, a second electrode connected to the QF2 node, and a gate electrode that receives the high voltage VGH. The twentieth transistor T20 may always be maintained in a turned-on state.

The twenty-second transistor T22 may include a first electrode that receives the second clock signal CLK2, a second electrode, and a gate electrode connected to the QF2 node.

The fourth capacitor C4 may include a first electrode connected to the second electrode of the twenty-second transistor T22 and a second electrode connected to the QF2 node. The fourth capacitor C4 may function as a boosting capacitor boosting the voltage of the QF2 node. In an embodiment, for example, when the second clock signal CLK2 has the high voltage VGH and the voltage of the Q2 node is the high voltage VGH, the sum of the high voltage VGH of the Q2 node and the boosting voltage may be applied to the QF2 node by the boosting of the fourth capacitor C4.

The first signal processor 251 may control a voltage of the first node N1 based on the voltage of the Q1 node, the first clock signal CLK1, the high voltage VGH, and the second clock signal CLK2. The first signal processor 251 may include a fifth transistor T5, a seventh transistor T7, a ninth transistor T9, an eleventh transistor T11, and a first capacitor C1.

The fifth transistor T5 may include a first electrode that receives the first clock signal CLK1, a second electrode, and a gate electrode connected to the Q1 node.

In an embodiment, the fifth transistor T5 may include a plurality of sub-transistors T5-1 and T5-2 connected to each other in series. Each of the sub-transistors T5-1 and T5-2 may include a gate electrode commonly connected to the Q1 node. Accordingly, current leakage by the fifth transistor T5 may be minimized.

The seventh transistor T7 may include a first electrode connected to the second electrode of the fifth transistor T5, a second electrode that receives the high voltage VGH, and a gate electrode that receives the first clock signal CLK1.

The ninth transistor T9 may include a first electrode connected to the second electrode of the fifth transistor T5, a second electrode, and a gate electrode that receives the high voltage VGH.

The eleventh transistor T11 may include a first electrode that receives the second clock signal CLK2, a second electrode connected to the first node N1, and a gate electrode connected to the second electrode of the ninth transistor T9.

The first capacitor C1 may include a first electrode connected to the second electrode of the ninth transistor T9 and a second electrode connected to the first node N1.

The second signal processor 252 may control a voltage of the second node N2 based on the voltage of the Q2 node, the first clock signal CLK1, the high voltage VGH, and the second clock signal CLK2. The second signal processor 252 may include a sixth transistor T6, an eighth transistor T8, a tenth transistor T10, a twelfth transistor T12, and a second capacitor C2.

The sixth transistor T6 may include a first electrode that receives the first clock signal CLK1, a second electrode, and a gate electrode connected to the Q2 node.

In an embodiment, the sixth transistor T6 may include a plurality of sub-transistors T6-1 and T6-2 connected to each other in series. Each of the sub-transistors T6-1 and T6-2 may include a gate electrode commonly connected to the Q2 node. Accordingly, current leakage by the sixth transistor T6 may be minimized.

The eighth transistor T8 may include a first electrode connected to the second electrode of the sixth transistor T6, a second electrode that receives the high voltage VGH, and a gate electrode that receives the first clock signal CLK1.

The tenth transistor T10 may include a first electrode connected to the second electrode of the sixth transistor T6, a second electrode, and a gate electrode that receives the high voltage VGH.

The twelfth transistor T12 may include a first electrode that receives the second clock signal CLK2, a second electrode connected to the second node N2, and a gate electrode connected to the second electrode of the tenth transistor T10.

The second capacitor C2 may include a first electrode connected to the second electrode of the tenth transistor T10 and a second electrode connected to the second node N2.

The QB1 node control circuit 261 may control the voltage of the QB1 node based on the voltage of the first node N1 and the voltage of the Q1 node. The QB1 node control circuit 261 may include a thirteenth transistor T13 and a twenty-third transistor T23.

The thirteenth transistor T13 may include a first electrode that receives the high voltage VGH, a second electrode connected to the QB1 node, and a gate electrode connected to the first node N1.

The twenty-third transistor T23 may include a first electrode that receives the second low voltage VGL2, a second electrode connected to the QB1 node, and a gate electrode connected to the Q1 node.

FIG. 3 illustrates an embodiment in which the twenty-third transistor T23 is a transistor having a single gate structure, but the disclosure is not limited thereto. In an alternative embodiment, the twenty-third transistor T23 may be a transistor having a double, triple, or quadruple gate structure including a plurality of sub-transistors connected to each other in series. In such an embodiment, each of the sub-transistors may include a gate electrode commonly connected to the Q1 node.

The QB2 node control circuit 262 may control the voltage of the QB2 node based on the voltage of the second node N2 and the voltage of the Q2 node. The QB2 node control circuit 262 may include a fourteenth transistor T14 and a twenty-fourth transistor T24.

The fourteenth transistor T14 may include a first electrode that receives the high voltage VGH, a second electrode connected to the QB2 node, and a gate electrode connected to the second node N2.

The twenty-fourth transistor T24 may include a first electrode that receives the second low voltage VGL2, a second electrode connected to the QB2 node, and a gate electrode connected to the Q2 node.

FIG. 3 illustrates an embodiment in which the twenty-fourth transistor T24 is a transistor having a single gate structure, but the disclosure is not limited thereto. In an alternative embodiment, the twenty-fourth transistor T24 may be a transistor having a double, triple, or quadruple gate structure including a plurality of sub-transistors connected to each other in series. In such an embodiment, each of the sub-transistors may include a gate electrode commonly connected to the Q2 node.

The QBF node control circuit 270 may control the voltage of the QBF node based on the voltage of the first node N1, the voltage of the second node N2, the voltage of the Q1 node, and the voltage of the Q2 node. The QBF node control circuit 270 may include a fifteenth transistor T15, a sixteenth transistor T16, a thirty-first transistor T31, and a thirty-second transistor T32.

The fifteenth transistor T15 may include a first electrode that receives the high voltage VGH, a second electrode, and a gate electrode connected to the first node N1.

The sixteenth transistor T16 may include a first electrode connected to the second electrode of the fifteenth transistor T15, a second electrode connected to the QBF node, and a gate electrode connected to the second node N2.

The thirty-first transistor T31 may include a first electrode that receives the second low voltage VGL2, a second electrode connected to the QBF node, and a gate electrode connected to the Q1 node.

The thirty-second transistor T32 may include a first electrode that receives the second low voltage VGL2, a second electrode connected to the QBF node, and a gate electrode connected to the Q2 node.

In an embodiment, the stage ST[n] may further include a thirty-fourth transistor T34 and a thirty-fifth transistor T35.

The thirty-fourth transistor T34 may include a first electrode that receives the high voltage VGH, a second electrode connected between the sub-transistors T1-1 and T1-2 of the first transistor T1, and a gate electrode connected to the Q1 node.

In an embodiment, the thirty-fourth transistor T34 may include a plurality of sub-transistors T34-1 and T34-2 connected to each other in series. Each of the sub-transistors T34-1 and T34-2 may include a gate electrode commonly connected to the Q1 node. Accordingly, current leakage by the thirty-fourth transistor T34 may be minimized.

The thirty-fifth transistor T35 may include a first electrode that receives the high voltage VGH, a second electrode connected between the sub-transistors T2-1 and T2-2 of the second transistor T2, and a gate electrode connected to the Q2 node.

In an embodiment, the thirty-fifth transistor T35 may include a plurality of sub-transistors T35-1 and T35-2 connected to each other in series. Each of the sub-transistors T35-1 and T35-2 may include a gate electrode commonly connected to the Q2 node. Accordingly, current leakage by the thirty-fifth transistor T35 may be minimized.

FIG. 3 illustrates an embodiment in which each of the thirty-fourth transistor T34 and the thirty-fifth transistor T35 is a transistor having a double gate structure, but the disclosure is not limited thereto. In an alternative embodiment, at least one of the thirty-fourth transistor T34 and the thirty-fifth transistor T35 may be a transistor having a triple or quadruple gate structure.

In an embodiment, each of the transistors T1, T2, . . . , T34, T35 included in the stage ST[n] may be an N-type transistor. In an embodiment, each of the transistors T1, T2, . . . , T34, T35 included in the stage ST[n] may be one of an oxide semiconductor transistor and an amorphous silicon transistor.

FIG. 3 illustrates an embodiment in which each of the transistors T7, T8, . . . , T16, T19, . . . , T32, T33 and the sub-transistors T1-1, T1-2, . . . , T6-2, T17-1, . . . , T18-2, T34-1, . . . , T35-1, T35-2 included in the stage ST[n] includes three electrodes (a source electrode, a drain electrode, and a gate electrode). However, the disclosure is not limited thereto. In an alternative embodiment, at least one selected from the transistors T7, T8, . . . , T16, T19, . . . , T32, T33 and the sub-transistors T1-1, T1-2, . . . , T6-2, T17-1, . . . , T18-2, T34-1, . . . , T35-1, T35-2 included in the stage ST[n] may include four electrodes (a source electrode, a drain electrode, a gate electrode, and a back gate electrode). In such an embodiment, the back gate electrode may be connected to the gate electrode or may receive a power voltage (e.g., the high voltage VGH, the first low voltage VGL, the second low voltage VGL2, or the like).

Figure 4:
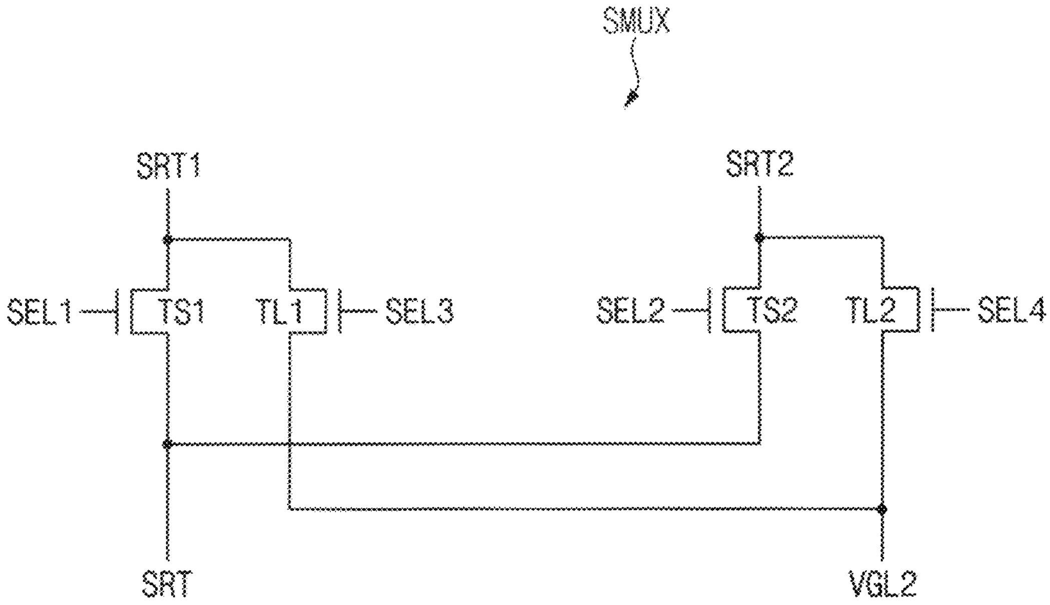
FIG. 4 is a circuit diagram illustrating an embodiment of a start multiplexer included in the driver in FIG. 2.

FIG. 4 is a circuit diagram illustrating an embodiment of the start multiplexer SMUX included in the driver 200 in FIG. 2.

Referring to FIG. 4, the start multiplexer SMUX may include a first start transistor TS1, a second start transistor TS2, a first low transistor TL1, and a second low transistor TL2.

The first start transistor TS1 may include a first electrode that receives the start signal SRT, a second electrode that outputs the first start signal SRT1, and a gate electrode that receives a first selection signal SEL1. The first start transistor TS1 may be turned on when the first selection signal SELL has a gate-on level to output the start signal SRT as the first start signal SRT1.

The second start transistor TS2 may include a first electrode that receives the start signal SRT, a second electrode that outputs the second start signal SRT2, and a gate electrode that receives a second selection signal SEL2. The second start transistor TS2 may be turned on when the second selection signal SEL2 has a gate-on level to output the start signal SRT as the second start signal SRT2.

The first low transistor TL1 may include a first electrode that receives the second low voltage VGL2, a second electrode that outputs the first start signal SRT1, and a gate electrode that receives a third selection signal SEL3. The first low transistor TL1 may be turned on when the third selection signal SEL3 has a gate-on level to output the second low voltage VGL2 as the first start signal SRT1.

The second low transistor TL2 may include a first electrode that receives the second low voltage VGL2, a second electrode that outputs the second start signal SRT2, and a gate electrode that receives a fourth selection signal SEL4. The second low transistor TL2 may be turned on when the fourth selection signal SEL4 has a gate-on level to output the second low voltage VGL2 as the second start signal SRT2.

Figure 5:
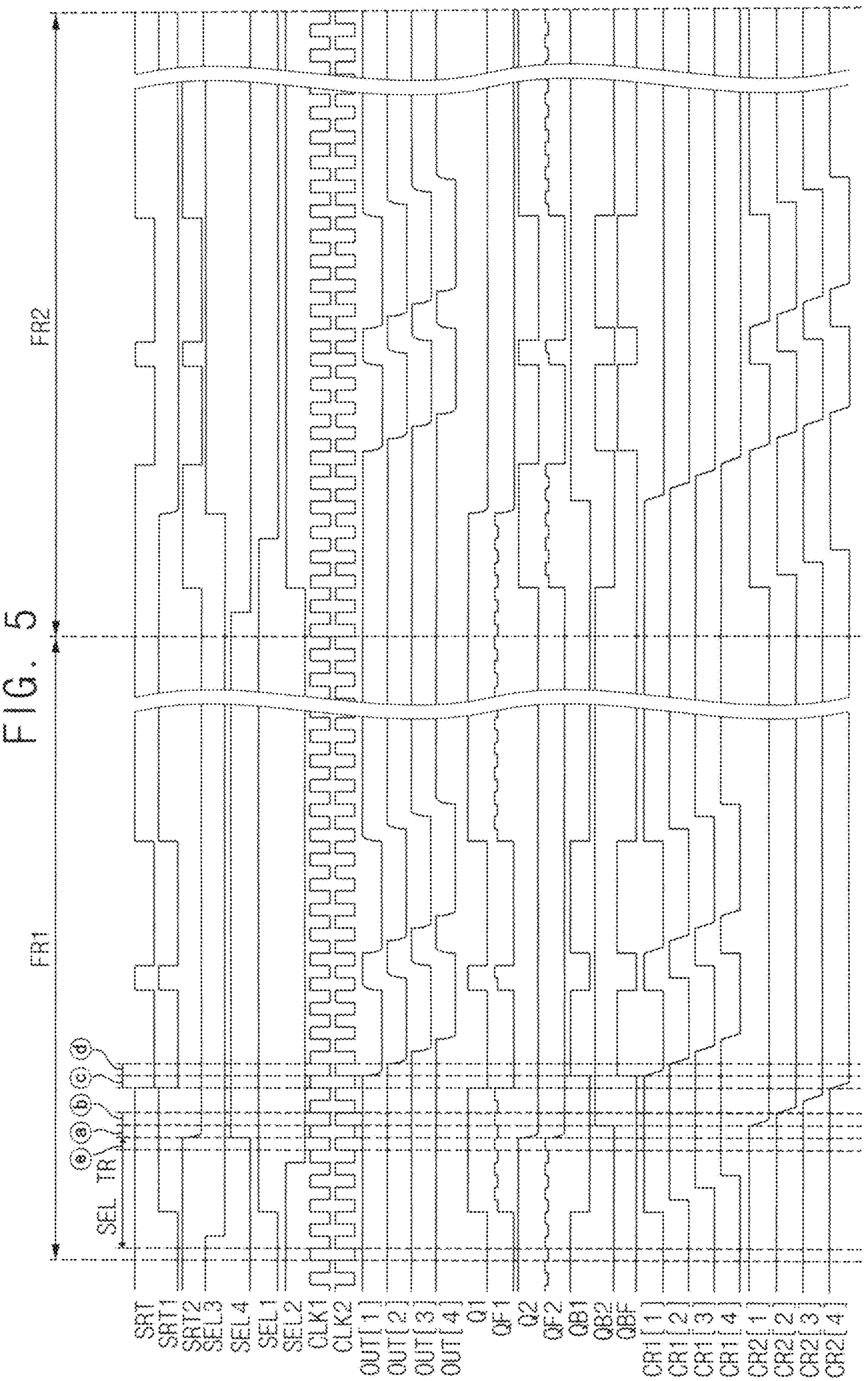
FIG. 5 is a waveform diagram illustrating input signals and output signals of the driver in FIG. 2.

FIG. 5 is a waveform diagram illustrating input signals and output signals of the driver 200 in FIG. 2.

Referring to FIGS. 3, 4, and 5, the first start signal SRT1 and the second start signal SRT2 may be alternately changed for predetermined frame times.

In an embodiment, as illustrated in FIG. 5, the first start signal SRT1 and the second start signal SRT2 may be alternately changed for each frame time (or frame period). In such an embodiment, the first start signal SRT1 may have a first wave form in a frame time and the second start signal SRT2 may have a second waveform in the frame time, and the first start signal SRT1 may have the second wave form in a next frame time and the second start signal SRT2 may have the first waveform in the next frame time. However, the disclosure is not limited thereto, and in an alternative embodiment, the first start signal SRT1 and the second start signal SRT2 may be alternately changed for a plurality of frame times. In such an embodiment, the first start signal SRT1 may have a first wave form in a plurality of frame times and the second start signal SRT2 may have a second waveform in the plurality of frame times, and the first start signal SRT1 may have the second wave form in a next plurality of frame times and the second start signal SRT2 may have the first waveform in the next plurality of frame times.

In an embodiment, the first start signal SRT1 of a first frame time FR1 may be substantially the same as the second start signal SRT2 of a second frame time FR2 following the first frame time FR1, and the second start signal SRT2 of the first frame time FR1 may be substantially the same as the first start signal SRT1 of the second frame time FR2. In such an embodiment, the first start signal SRT1 of the first frame time FR1 may be substantially the same as the first start signal SRT1 of a third frame time following the second frame time FR2, and the second start signal SRT2 of the first frame time FR1 may be substantially the same as the second start signal SRT2 of the third frame time.

The first selection signal SEL1, the second selection signal SEL2, the third selection signal SEL3, and the fourth selection signal SEL4 may be alternately changed for the predetermined frame times. In an embodiment, the first selection signal SEL1 of the second frame time FR2 may be substantially the same as the second selection signal SEL2 of the first frame time FR1, and the second selection signal SEL2 of the second frame time FR2 may be substantially the same as the first selection signal SEL1 of the first frame time FR1. In such an embodiment, the third selection signal SEL3 of the second frame time FR2 may be substantially the same as the fourth selection signal SEL4 of the first frame time FR1, and the fourth selection signal SEL4 of the second frame time FR2 may be substantially the same as the third selection signal SEL3 of the first frame time FR1. As the first selection signal SEL1, the second selection signal SEL2, the third selection signal SEL3, and the fourth selection signal SEL4 are alternately changed for the predetermined frame times, the first start signal SRT1 and the second start signal SRT2 output in response to the first selection signal SEL1, the second selection signal SEL2, the third selection signal SEL3, and the fourth selection signal SEL4 may be alternately changed for the predetermined frame times.

Hereinafter, the operation of the first stage ST[1] in the first frame time FR1 will be described.

In a selection transition period SEL TR, the first selection signal SEL1 may transition from the second low voltage VGL2 to the high voltage VGH, the second selection signal SEL2 may transition from the high voltage VGH to the second low voltage VGL2, the third selection signal SEL3 may transition from the high voltage VGH to the second low voltage VGL2, and the fourth selection signal SEL4 may transition from the second low voltage VGL2 to the high voltage VGH. In this case, after the selection transition period SEL TR, the first start transistor TS1 may be turned on in response to the first selection signal SEL1 and the first low transistor TL1 may be turned off in response to the third selection signal SEL3, so that the first start signal SRT1 may be the same as the start signal SRT. Further, after the selection transition period SEL TR, the second start transistor TS2 may be turned off in response to the second selection signal SEL2 and the second low transistor TL2 may be turned on in response to the fourth selection signal SEL4, so that the second start signal SRT2 may have the second low voltage VGL2.

In a first period ⓐ after the selection transition period SEL TR, the first input signal IN1[1] may have the high voltage VGH of the first start signal SRT1, the second input signal IN2[1] may have the second low voltage VGL2 of the second start signal SRT2, the first clock signal CLK1 may have the high voltage VGH, and the second clock signal CLK2 may have the second low voltage VGL2. The first transistor T1 and the nineteenth transistor T19 may be turned to apply the high voltage VGH to the Q1 node and the QF1 node, and the second transistor T2 and the twentieth transistor T20 may be turned on to apply the second low voltage VGL2 to the Q2 node and the QF2 node. The twenty-fifth transistor T25 may be turned on so that the first carry signal CR1[1] may become the high voltage VGH, and the twenty-ninth transistor T29 may be turned on so that the stage output signal OUT[1] may become the high voltage VGH. The twenty-sixth transistor T26 and the thirtieth transistor T30 may be turned off in response to the second low voltage VGL2 applied to the Q2 node and the QF2 node.

In the first period ⓐ where the first input signal IN1[1] has the high voltage VGH of the first start signal SRT1 and the first clock signal CLK1 has the high voltage VGH, the fifth transistor T5 and the seventh transistor T7 may be turned on to turn on the eleventh transistor T11, and the second low voltage VGL2 may be applied to the first node N1 to turn off the thirteenth transistor T13 and the fifteenth transistor T15. Accordingly, the twenty-third transistor T23 and the thirty-first transistor T31 may be turned on in response to the high voltage VGH of the Q1 node to apply the second low voltage VGL2 to the QB1 node and the QBF node, and the twenty-seventh transistor T27 and the thirty-third transistor T33 may be turned off. The twenty-fourth transistor T24, the thirty-second transistor T32, and the sixth transistor T6 may be turned off in response to the second low voltage VGL2 of the Q2 node. The eighth transistor T8 may be turned on in response to the high voltage VGH of the first clock signal CLK1 to turn on the twelfth transistor T12, and the second low voltage VGL2 may be applied to the second node N2 to turn off the fourteenth transistor T14 and the sixteenth transistor T16. The QB2 node may maintain the second low voltage VGL2 that is a voltage thereof in a fifth period ⓔ immediately before the end of the selection transition period SEL TR, and the second carry signal CR2[1] may maintain the high voltage VGH that is a voltage thereof in the fifth period ⓔ. The third capacitor C3 may maintain a voltage corresponding to a difference between the high voltage VGH and the second low voltage VGL2.

In a second period ⓑ after the first period ⓐ, the first clock signal CLK1 may have the second low voltage VGL2, and the second clock signal CLK2 may have the high voltage VGH. Accordingly, the first transistor T1 may be turned off, so that the Q1 node and the QF1 node may be floated and the third capacitor C3 may be boosted. The sum of the high voltage VGH and the boosting voltage may be applied to the QF1 node by the boosting of the third capacitor C3. The Q1 node may maintain the high voltage VGH. The fifth transistor T5 may be turned on and the seventh transistor T7 may be turned off to turn off the eleventh transistor T11, and accordingly, the thirteenth transistor T13 and the fifteenth transistor T15 may be turned off. The twenty-third transistor T23 and the thirty-first transistor T31 may be turned on in response to the high voltage VGH of the Q1 node to apply the second low voltage VGL2 to the QB1 node and the QBF node. The second transistor T2 may be turned off so that the Q2 node and the QF2 node may maintain the second low voltage VGL2 in the second period ⓑ. The sixth transistor T6 and the eighth transistor T8 may be turned off, so that the twelfth transistor T12 may maintain a turned-on state of the second period ⓑ. Accordingly, the high voltage VGH may be applied to the second node N2 to turn on the fourteenth transistor T14, and the high voltage VGH may be applied to the QB2 node. The twenty-eighth transistor T28 may be turned on in response to the high voltage VGH of the QB2 node, and the second carry signal CR2[1] may become the second low voltage VGL2.

In a third period ⓒ after the second period ⓑ, the first input signal IN1[1] may have the second low voltage VGL2 of the first start signal SRT1, the second input signal IN2[1] may have the second low voltage VGL2 of the second start signal SRT2, the first clock signal CLK1 may have the high voltage VGH, and the second clock signal CLK2 may have the second low voltage VGL2. Accordingly, the first transistor T1 and the nineteenth transistor T19 may be turned on, so that the second low voltage VGL2 may be applied to the Q1 node and the QF1 node, and the second low voltage VGL2 may be applied to the Q2 node and the QF2 node. The twenty-third transistor T23, the thirty-first transistor T31, and the fifth transistor T5 may be turned off in response to the second low voltage VGL2 of the Q1 node. The eleventh transistor T11 may be turned on and the second low voltage VGL2 may be applied to the first node N1 to turn off the thirteenth transistor T13 and the fifteenth transistor T15. Accordingly, the QB1 node may maintain the second low voltage VGL2 that is a voltage thereof in the second period ⓑ, and the first carry signal CR1[1] may maintain the high voltage VGH that is a voltage thereof in the second period ⓑ.

In the third period ⓒ, the sixth transistor T6 may be turned off in response to the second low voltage VGL2 of the Q2 node. The eighth transistor T8 may be turned on in response to the first clock signal CLK1 having the high voltage VGH, so that the twelfth transistor T12 may be turned on, and the second low voltage VGL2 may be applied to the second node N2 to turn off the fourteenth transistor T14 and the sixteenth transistor T16. Accordingly, the QB2 node may maintain the high voltage VGH that is a voltage thereof in the second period ⓑ. The twenty-eighth transistor T28 may be turned on in response to the high voltage VGH of the QB2 node, so that the second carry signal CR2[1] may become the second low voltage VGL2. The QBF node may maintain the second low voltage VGL2 that is a voltage thereof in the second period ⓑ. Accordingly, the twenty-ninth transistor T29, the thirtieth transistor T30, and the thirty third transistor T33 may be turned off so that the stage output signal OUT[1] may maintain the high voltage VGH that is a voltage thereof in the second period ⓑ.

In a fourth period ⓓ after the third period ⓒ, the Q1 node, the QF1 node, the Q2 node, and the QF2 node may maintain the second low voltage VGL2 that is a voltage thereof in the third period ⓒ. Accordingly, the fifth transistor T5 may be turned off, and a voltage twice the high voltage VGH may be applied to the gate electrode of the eleventh transistor T11 by the boosting of the first capacitor C1 to turn on the eleventh transistor T11. Accordingly, the second clock signal CLK2 having the high voltage VGH may be applied to the first node N1 to turn on the thirteenth transistor T13 and the fifteenth transistor T15. The twenty-third transistor T23 may be turned off so that the high voltage VGH may be applied to the QB1 node, and the twenty-seventh transistor T27 may be turned on. Accordingly, the first carry signal CR1[1] may become the second low voltage VGL2.

In the fourth period ⓓ, the sixth transistor T6 may be turned off, and a voltage twice the high voltage VGH may be applied to the gate electrode of the twelfth transistor T12 by the boosting of the second capacitor C2 to turn on the twelfth transistor T12. Accordingly, the second clock signal CLK2 having the high voltage VGH may be applied to the second node N2 to turn on the fourteenth transistor T14 and the sixteenth transistor T16. The twenty-fourth transistor T24 may be turned off so that the high voltage VGH may be applied to the QB2 node, and the twenty-eighth transistor T28 may be turned on so that the second carry signal CR2[1] may become the second low voltage VGL2.

In the fourth period ⓓ, the Q1 node and the Q2 node may maintain the second low voltage VGL2 so that the thirty-first transistor T31 and the thirty-second transistor T32 may be turned off, and the fifteenth transistor T15 and the sixteenth transistor T16 may be turned on so that the high voltage VGH may be applied to the QBF node. Accordingly, the thirty-third transistor T33 may be turned on. The QF1 node and the QF2 node may maintain the second low voltage VGL2 so that the twenty ninth transistor T29 and the thirtieth transistor T30 may be turned off, and the stage output signal OUT[1] may become the first low voltage VGL.

In the first frame time FR1, the stages ST[1], ST[2], ST[3], and ST[4] may sequentially output shifted output signals. The output signals OUT[k+1], CR1[*k*+1], and CR2[*k*+1] of the $(k+1)^{th}$ stage ST[k+1] may be signals from which the output signals OUT[k], CR1[*k*], and CR2[*k*] of the $k^{th}$ stage ST[k+1] are shifted, respectively.

In general, the start signal SRT that is not changed for a frame time is applied from the outside of the driver 200. However, the driver 200 according to an embodiments may include the start multiplexer SMUX, and the start multiplexer SMUX may generate the first and second start signals SRT1 and SRT2 that are alternately changed for the predetermined frame times using the start signal SRT, the second low voltage VGL2, and the selection signals SEL1, SEL2, SEL3, and SEL4. Accordingly, in such an embodiment, the first and second input signals IN1[*n*] and IN2[*n*] input to the stage ST[n] may be alternately changed for the predetermined frame times. In such an embodiment, the first and second start signals SRT1 and SRT2 that are alternately changed for the predetermined frame times may be input to the first stage ST[1], and the first and second carry signals CR1[*n*] and CR2[*n*] that are alternately changed for the predetermined frame times may be input to each of the second to $M^{th}$ stages ST[2], ST[3], . . . .

The first and second input signals IN1[*n*] and IN2[*n*] input to the stage ST[n] may be alternately changed for the predetermined frame times, so that a voltage that is alternately changed for the predetermined frame times may be applied to each of the nodes of the stage ST[n]. As illustrated in FIG. 5, a voltage that is alternately changed for the predetermined frame times may be applied to each of the Q1 node, the QF1 node, the Q2 node, the QF2 node, the QB1 node, and the QB2 node.

When a positive bias or a negative bias is continuously applied to an N-type oxide semiconductor transistor or an N-type amorphous silicon transistor, a threshold voltage of the transistor may be shifted positively or negatively, and accordingly, the characteristics of the transistor may be degraded. When the characteristics of the transistor are degraded, the transistor may not correctly operate, and accordingly, the stage output signal may be output inaccurately from the driver.

In embodiments of the invention, the first and second input signals IN1 [n] and IN2[*n*] input to the stage ST[n] may be alternately changed for the predetermined frame times, so that a voltage that is alternately changed for the predetermined frame times may be applied to each of the nodes of the stage ST[n], and the first and second carry signals CR1 [n] and CR2[*n*] output from the stage ST[n] may be alternately changed for the predetermined frame times. Accordingly, a positive bias and a negative bias may be alternately applied to the transistor included in the stage ST[n] for the predetermined frame times, such that the threshold voltage of the transistor may not shift positively or negatively, thereby effectively preventing degradation of the characteristics of the transistor.

An output duty (e.g., an on-period or an off-period of the stage output signal OUT[n]) of the stage output signal OUT[n] may be adjusted according to the driving of the display device 100, and thus, the start signal SRT of which the on-period (or off-period) is adjusted according to the driving of the display device 100 may be provided to the driver 200. In embodiments of the invention, the start multiplexer SMUX may generate the first and second start signals SRT1 and SRT2 independent of the on-period (or off-period) of the start signal SRT using the second low voltage VGL2 and the selection signals SEL1, SEL2, SEL3, and SEL4, and accordingly, the first and second carry signals CR1 [n] and CR2[*n*] from which the first and second start signals SRT1 and SRT2 are shifted may have an on-period (or off-period) independently of the on-period (or off-period) of the start signal SRT.

Conventionally, first and second input signals IN1 [n] and IN2[*n*] applied to the stages ST[n] of the driver may be simultaneously controlled to control a bias applied to a transistor included in the stage. When the first and second input signals IN1[*n*] and IN2[*n*] applied to the stages ST[n] are simultaneously controlled, a problem in which a horizontal line is recognized on the display device 100 may occur. However, in embodiments of the invention, the first and second input signals IN1[*n*] and IN2[*n*] that are sequentially shifted may be applied to the stages ST[n] of the driver 200, so that the problem in which the horizontal line is recognized on the display device 100 may not occur.

Figure 6:
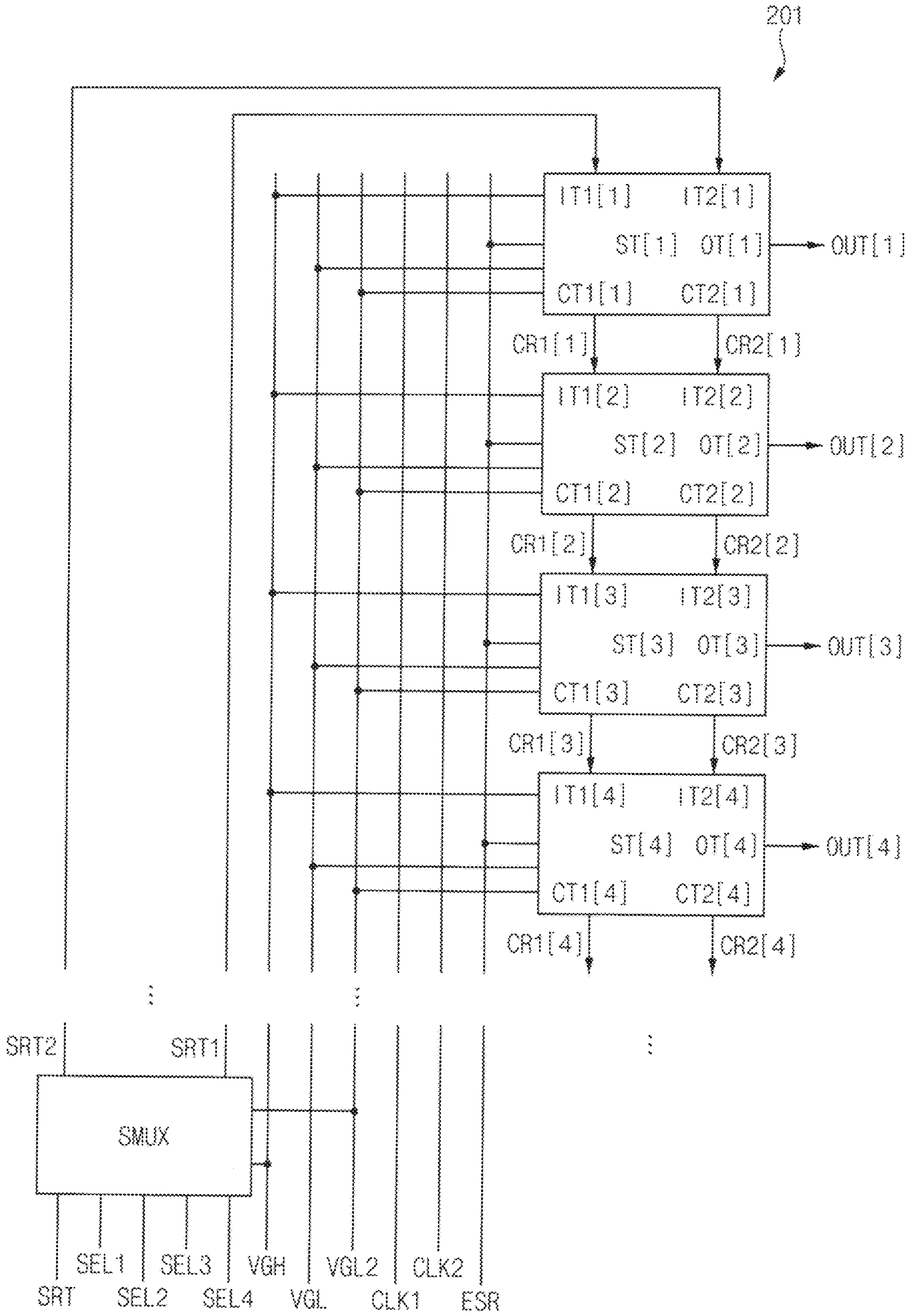
FIG. 6 is a block diagram illustrating a driver according to an embodiment.

FIG. 6 is a block diagram illustrating a driver 201 according to an embodiment.

Referring to FIG. 6, the driver 201 may include first to $M^{th}$ stages ST[1], ST[2], . . . and a start multiplexer SMUX. The driver 201 shown in FIG. 6 may be substantially the same as or similar to the driver 200 described above with reference to FIG. 2 except for signals input to the start multiplexer SMUX. Accordingly, any repetitive detailed descriptions of the same or like components of the driver 201 shown in FIG. 6 as those of the driver 200 described above with reference to FIG. 2 will be omitted.

The start signal SRT, the second low voltage VGL2, and the high voltage VGH may be input to the start multiplexer SMUX, and the start multiplexer SMUX may output the first start signal SRT1 and the second start signal SRT2 to the first stage ST[1].

Figure 7:
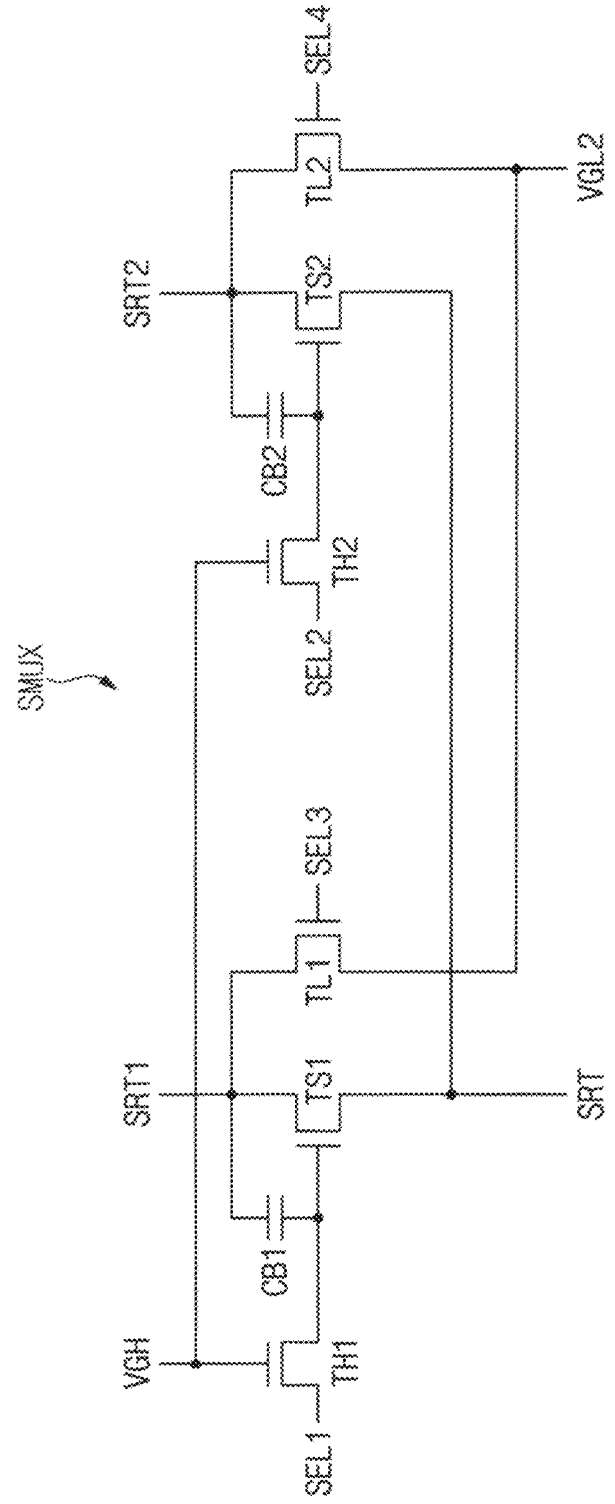
FIG. 7 is a circuit diagram illustrating an embodiment of a start multiplexer included in the driver in FIG. 6.

FIG. 7 is a circuit diagram illustrating an embodiment of the start multiplexer SMUX included in the driver 201 in FIG. 6.

Referring to FIG. 7, an embodiment of the start multiplexer SMUX may include a first high transistor TH1, a second high transistor TH2, a first start transistor TS1, a second start transistor TS2, a first boost capacitor CM, a second boost capacitor CB2, a first low transistor TL1, and a second low transistor TL2. The start multiplexer SMUX described with reference to FIG. 7 may be substantially the same as or similar to the start multiplexer SMUX described above with reference to FIG. 4 except that the start multiplexer SMUC further includes the first high transistor TH1, the second high transistor TH2, the first boost capacitor CB1, and the second boost capacitor CB2. Accordingly, any repetitive detailed descriptions of the same or like components of the start multiplexer SMUX shown in FIG. 7 as those of the start multiplexer SMUX described above with reference to FIG. 4 will be omitted.

In such an embodiment, as shown in FIG. 7, the first high transistor TH1 may include a first electrode that receives the first selection signal SEL1, a second electrode, and a gate electrode that receives the high voltage VGH. The first high transistor TH1 may always be maintained in a turned-on state, and accordingly, the first selection signal SEL1 may be applied to the second electrode of the first high transistor TH1.

The second high transistor TH2 may include a first electrode that receives the second selection signal SEL2, a second electrode, and a gate electrode that receives the high voltage VGH. The second high transistor TH2 may always be maintained in a turned-on state, and accordingly, the second selection signal SEL2 may be applied to the second electrode of the second high transistor TH2.

The first start transistor TS1 may include a first electrode that receives the start signal SRT, a second electrode that outputs the first start signal SRT1, and a gate electrode connected to the second electrode of the first high transistor TH1. The first start transistor TS1 may be turned on when the first selection signal SELL has a gate-on level to output the start signal SRT as the first start signal SRT1.

The second start transistor TS2 may include a first electrode that receives the start signal SRT, the second electrode that outputs the second start signal SRT2, and a gate electrode connected to the second electrode of the second high transistor TH2. The second start transistor TS2 may be turned on when the second selection signal SEL2 has a gate-on level to output the start signal SRT as the second start signal SRT2.

The first boost capacitor CB1 may include a first electrode connected to the second electrode of the first high transistor TH1 and a second electrode connected to the second electrode of the first start transistor TS1. A voltage between a gate electrode and a source electrode (Vgs) of the first start transistor TS1 may increase by boosting of the first boost capacitor CB1, and accordingly, the first start transistor TS1 may be quickly turned on.

The second boost capacitor CB2 may include a first electrode connected to the second electrode of the second high transistor TH2 and a second electrode connected to the second electrode of the second start transistor TS2. A voltage between a gate electrode and a source electrode (Vgs) of the second start transistor TS2 may increase by boosting of the second boost capacitor CB2, and accordingly, the second start transistor TS2 may be quickly turned on.

Figure 8:
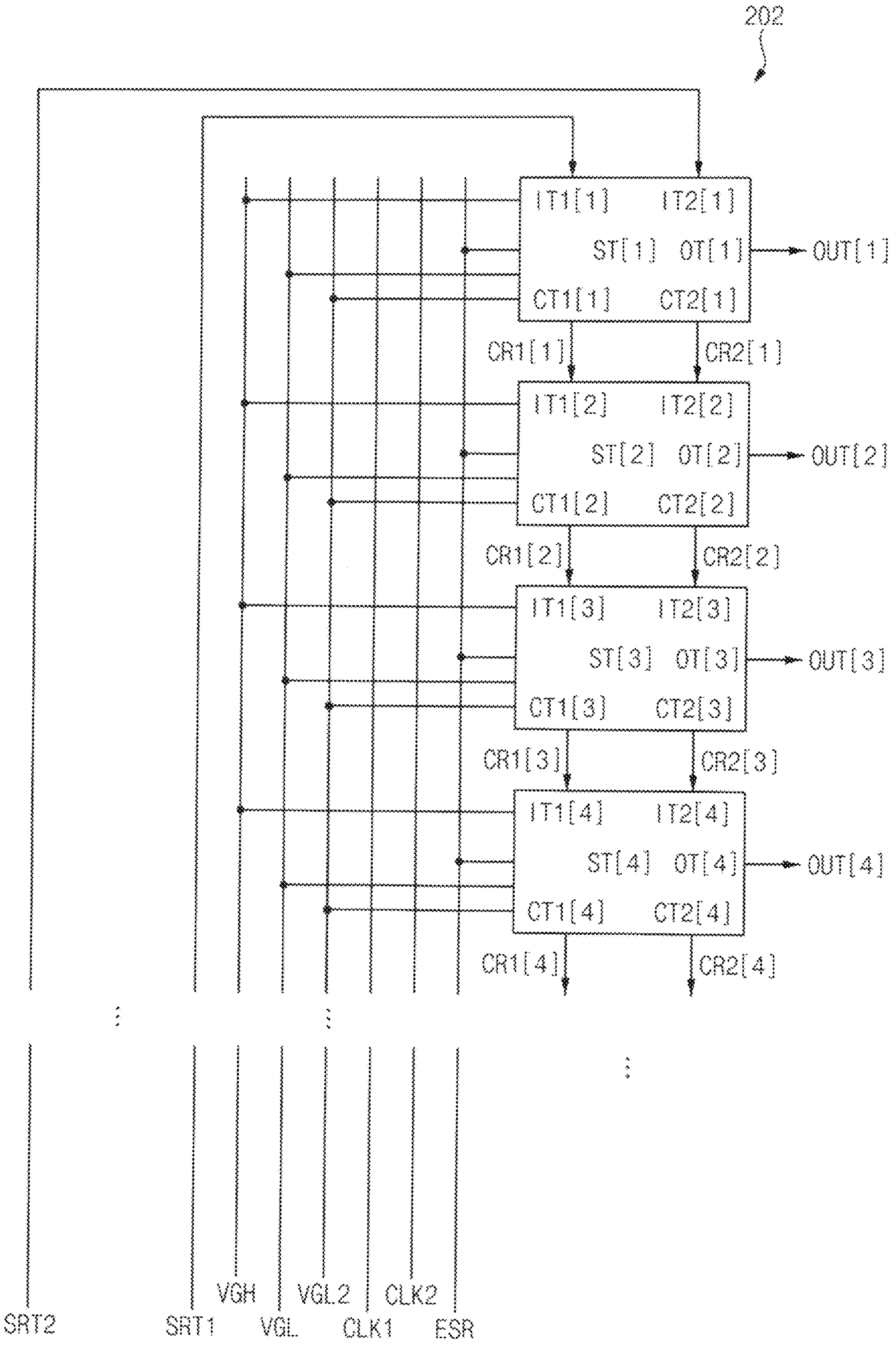
FIG. 8 is a block diagram illustrating a driver according to an embodiment.

FIG. 8 is a block diagram illustrating a driver 202 according to an embodiment.

Referring to FIG. 8, an embodiment of the driver 202 may include first to $M^{th}$ stages ST[1], ST[2], . . . . The driver 202 shown in FIG. 8 may be substantially the same as or similar to the driver 200 described above with reference to FIG. 2 except that the start multiplexer SMUX is omitted. In such an embodiment, the first start signal SRT1 and the second start signal SRT2 generated from the outside of the driver 202 may be input to the first stage ST[1] as the first input signal and the second input signal, respectively.

Figure 9:
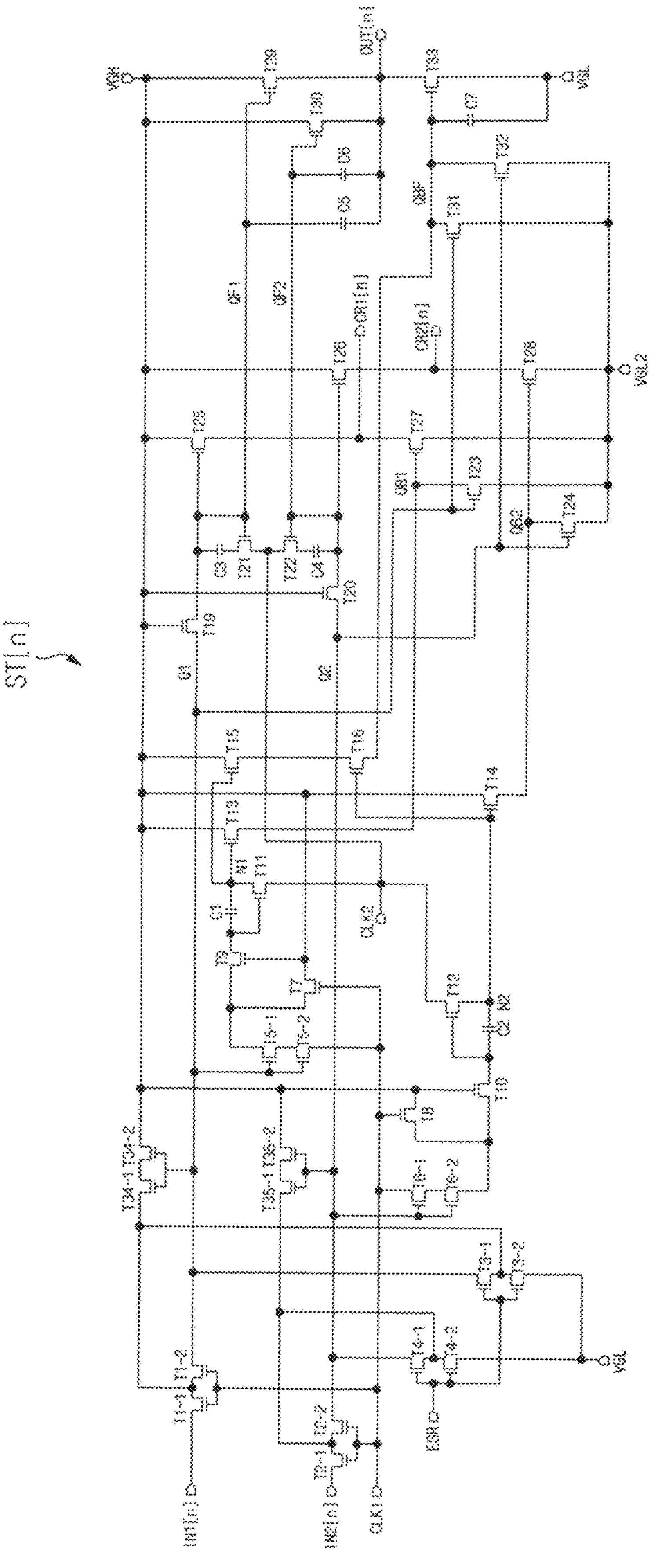
FIG. 9 is a circuit diagram illustrating a stage included in a driver according to an embodiment.

FIG. 9 is a circuit diagram illustrating a stage included in a driver according to an embodiment. Particularly, FIG. 9 may illustrate one stage ST[n] among the first to $M^{th}$ stages ST[1], ST[2], . . . in FIG. 2.

Referring to FIG. 9, an embodiment of the stage ST[n] may include a stage output circuit 210, a first carry output circuit 221, a second carry output circuit 222, a first input circuit 231, a second input circuit 232, a QF1 node control circuit 241, a QF2 node control circuit 242, a first signal processor 251, a second signal processor 252, a QB1 node control circuit 261, a QB2 node control circuit 262, and a QBF node control circuit 270. The stage ST[n] shown in FIG. 9 may be substantially the same as or similar to the stage ST[n] described above with reference to FIG. 3 except that the seventeenth transistor T17 and the eighteenth transistor T18 are omitted. In such an embodiment, the first input circuit 231 may control the voltage of the Q1 node based on the first input signal IN1[*n*], the first clock signal CLK1, the reset signal ESR, and the first low voltage VGL, and the second input circuit 232 may control the voltage of the Q2 node based on the second input signal IN2[*n*], the first clock signal CLK1, the reset signal ESR, and the first low voltage VGL.

The driver and the display device according to embodiments of the invention may be applied to a display device included in a computer, a notebook, a mobile phone, a smart phone, a smart pad, a portable media player (PMP), a personal digital assistance (PDA), an MP3 player, or the like.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A driver, comprising:

first to $M^{th}$ stages, wherein M is a natural number greater than or equal to 2, wherein each of the first to $M^{th}$ stages includes:

a first transistor including a gate electrode which receives a first clock signal, a first electrode connected to a first input terminal to which a first input signal is input, and a second electrode connected to a Q1 node;

a nineteenth transistor including a gate electrode which receives a high voltage, a first electrode which connected to the Q1 node, and a second electrode connected to a QF1 node;

a twenty-ninth transistor including a gate electrode connected to the QF1 node, a first electrode which receives the high voltage, and a second electrode connected to a stage output terminal from which a stage output signal is output;

a thirty-third transistor including a gate electrode connected to a QBF node, a first electrode which receives a first low voltage, and a second electrode connected to the stage output terminal; and a thirty-first transistor including a gate electrode connected to the Q1 node, a first electrode which receives a second low voltage, and a second electrode connected to the QBF node.

2. The driver of claim 1, wherein each of the first to Mth stages further includes:

a twenty-fifth transistor including a gate electrode connected to the QF1 node, a first electrode which receives the high voltage, and a second electrode connected to a first carry output terminal from which a first carry signal is output;

a twenty-seventh transistor including a gate electrode connected to a QB1 node, a first electrode which receives the second low voltage, and a second electrode connected to the first carry output terminal; and a twenty-third transistor including a gate electrode connected to the Q1 node, a first electrode which receives the second low voltage, and a second electrode connected to the QB1 node.

3. The driver of claim 2, wherein each of the first to Mth stages further includes:

a seventeenth transistor including a gate electrode connected to the QB1 node, a first electrode which receives the second low voltage, and a second electrode connected to the Q1 node.

4. The driver of claim 2, wherein each of the first to Mth stages further includes:

a fifth transistor including a gate electrode connected to the Q1 node, a first electrode which receives the first clock signal, and a second electrode;

a seventh transistor including a gate electrode receiving the first clock signal, a first electrode which receives the high voltage, and a second electrode connected to the second electrode of the fifth transistor;

a ninth transistor including a gate electrode which receives the high voltage, a first electrode connected to the second electrode of the fifth transistor, and a second electrode;

an eleventh transistor including a gate electrode connected to the second electrode of the ninth transistor, a first electrode which receives a second clock signal, and a second electrode connected to a first node;

a thirteenth transistor including a gate electrode connected to the first node, a first electrode which receives the high voltage, and a second electrode connected to the QB1 node; and a first capacitor including a first electrode connected to the second electrode of the ninth transistor and a second electrode connected to the first node.

5. The driver of claim 1, wherein each of the first to Mth stages further includes:

a twenty-first transistor including a gate electrode connected to the QF1 node, a first electrode which receives a second clock signal, and a second electrode; and a third capacitor including a first electrode connected to the second electrode of the twenty-first transistor and a second electrode connected to the QF1 node.

6. The driver of claim 1, wherein each of the first to Mth stages further includes:

a fifth capacitor including a first electrode connected to the QF1 node and a second electrode connected to the stage output terminal; and a seventh capacitor including a first electrode connected to the QBF node and a second electrode which receives the first low voltage.

7. The driver of claim 1, wherein each of the first to Mth stages further includes:

a third transistor including a gate electrode which receives a reset signal, a first electrode which receives the first low voltage, and a second electrode connected to the Q1 node.

8. The driver of claim 7, wherein each of the first transistor and the third transistor includes sub-transistors connected to each other in series, and wherein each of the first to Mth stages further includes:

a thirty-fourth transistor including a gate electrode connected to the Q1 node, a first electrode which receives the high voltage, and a second electrode connected to a node between the sub-transistors of each of the first transistor and the third transistor.

9. The driver of claim 1, wherein each of the first to Mth stages further includes:

a second transistor including a gate electrode which receives the first clock signal, a first electrode connected to a second input terminal to which a second input signal is input, and a second electrode connected to a Q2 node;

a twentieth transistor including a gate electrode which receives the high voltage, a first electrode which connected to the Q2 node, and a second electrode connected to a QF2 node;

a thirtieth transistor including a gate electrode connected to the QF2 node, a first electrode which receives the high voltage, and a second electrode connected to the stage output terminal; and a thirty-second transistor including a gate electrode connected to the Q2 node, a first electrode which receives the second low voltage, and a second electrode connected to the QBF node.

10. The driver of claim 9, wherein the stage output signal when the first input signal is applied to the first input terminal is different from the stage output signal when the second input signal is applied to the second input terminal.

11. The driver of claim 9, wherein each of the first to Mth stages further includes:

a twenty-sixth transistor including a gate electrode connected to the QF2 node, a first electrode which receives the high voltage, and a second electrode connected to a second carry output terminal from which a second carry signal is output;

a twenty-eighth transistor including a gate electrode connected to a QB2 node, a first electrode which receives the second low voltage, and a second electrode connected to the second carry output terminal; and a twenty-fourth transistor including a gate electrode connected to the Q2 node, a first electrode which receives the second low voltage, and a second electrode connected to the QB2 node.

12. The driver of claim 11, wherein each of the first to Mth stages further includes:

an eighteenth transistor including a gate electrode connected to the QB2 node, a first electrode which receives the second low voltage, and a second electrode connected to the Q2 node.

13. The driver of claim 11, wherein each of the first to Mth stages further includes:

a sixth transistor including a gate electrode connected to the Q2 node, a first electrode which receives the first clock signal, and a second electrode;

an eighth transistor including a gate electrode receiving the first clock signal, a first electrode which receives the high voltage, and a second electrode connected to the second electrode of the sixth transistor;

a tenth transistor including a gate electrode which receives the high voltage, a first electrode connected to the second electrode of the sixth transistor, and a second electrode;

a twelfth transistor including a gate electrode connected to the second electrode of the tenth transistor, a first electrode which receives a second clock signal, and a second electrode connected to a second node;

a fourteenth transistor including a gate electrode connected to the second node, a first electrode which receives the high voltage, and a second electrode connected to the QB2 node; and a second capacitor including a first electrode connected to the second electrode of the tenth transistor and a second electrode connected to the second node.

14. The driver of claim 9, wherein each of the first to Mth stages further includes:

a twenty-second transistor including a gate electrode connected to the QF2 node, a first electrode which receives a second clock signal, and a second electrode; and a fourth capacitor including a first electrode connected to the second electrode of the twenty-second transistor and a second electrode connected to the QF2 node.

15. The driver of claim 9, wherein each of the first to Mth stages further includes:

a sixth capacitor including a first electrode connected to the QF2 node and a second electrode connected to the stage output terminal.

16. The driver of claim 9, wherein each of the first to Mth stages further includes:

a fourth transistor including a gate electrode which receives a reset signal, a first electrode which receives the first low voltage, and a second electrode connected to the Q2 node.

17. The driver of claim 16, wherein each of the second transistor and the fourth transistor includes sub-transistors connected to each other in series, and wherein each of the first to Mth stages further includes:

a thirty-fifth transistor including a gate electrode connected to the Q2 node, a first electrode which receives the high voltage, and a second electrode connected to a node between the sub-transistors of each of the second transistor and the fourth transistor.

* * * * *